Sept. 27, 1949.　　　　H. W. ALDEN　　　　2,482,824
DUAL WHEEL ASSEMBLY

Filed Nov. 29, 1945　　　　　　　　　　2 Sheets-Sheet 1

Inventor
Herbert W. Alden
By Strauck & Hoffman
Attorneys

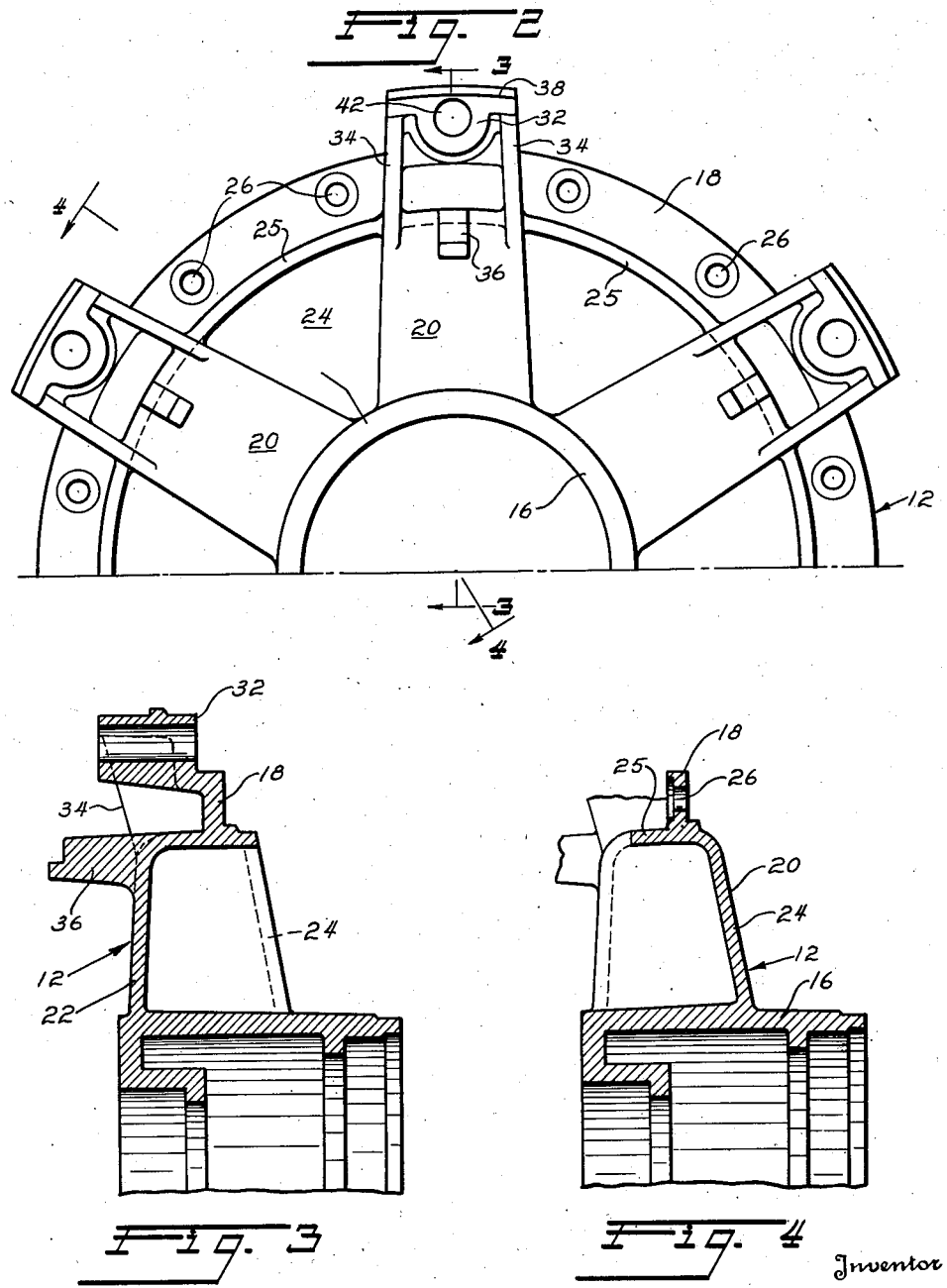

Patented Sept. 27, 1949

2,482,824

UNITED STATES PATENT OFFICE 2,482,824

DUAL WHEEL ASSEMBLY

Herbert W. Alden, Detroit, Mich., assignor to The Timken-Detroit Axle Company, Detroit, Mich., a corporation of Ohio Application November 29, 1945, Serial No. 631,596

12 Claims. (Cl. 301—36)

This invention relates to a dual wheel assembly and novel wheel structure, together with means for quickly mounting the wheels in accurately assembled spaced-apart relation on the non-driven axle of a trailer or similar vehicle.

One of the objects of the present invention is to provide an easily operable means which is readily accessible after the two wheels have been mounted on the axle for independently adjusting said wheels and their respective bearing means into cooperative relation with axially spaced wheel locating means upon the axle.

Another object of the invention resides in the provision of a novel backing or supporting plate for the brake actuating mechanism of the inner wheel and means for mounting said plate upon the axle, whereby said brake mechanism may be displaced inwardly along the axle for servicing without dismounting either of the wheels, or said supporting plate and the brake mechanism may be removed outwardly over the axle end, after the two wheels have first been dismounted.

An additional object of the invention is to provide a novel vehicle wheel structure which is not only radially rigid but will effectively nullify the distorting effects of high circumferential braking torque forces.

It is also the general aim and purpose of the present invention to provide a novel wheel structure and dual wheel and axle assembly, the production cost of which is reasonably low and in which the several parts are assembled and arranged to efficiently function with minimum maintenance expense.

With the above and other objects in view, the invention comprises the improved dual wheel assembly and the novel wheel structure as will hereinafter be more fully described, illustrated in the accompanying drawings, and subsequently incorporated in the subjoined claims.

In the drawings, wherein I have illustrated one simple and practical embodiment of the invention and in which similar reference characters indicate corresponding parts throughout the several views:

Figure 2 is a partial front side elevation showing the novel inner wheel structure in its preferred embodiment;

Figure 3 is a fragmentary sectional view of the inner wheel structure taken substantially on the line 3—3 of Figure 2; and Figure 4 is a similar sectional view taken substantially on the line 4—4 of Figure 2.

Figure 1:
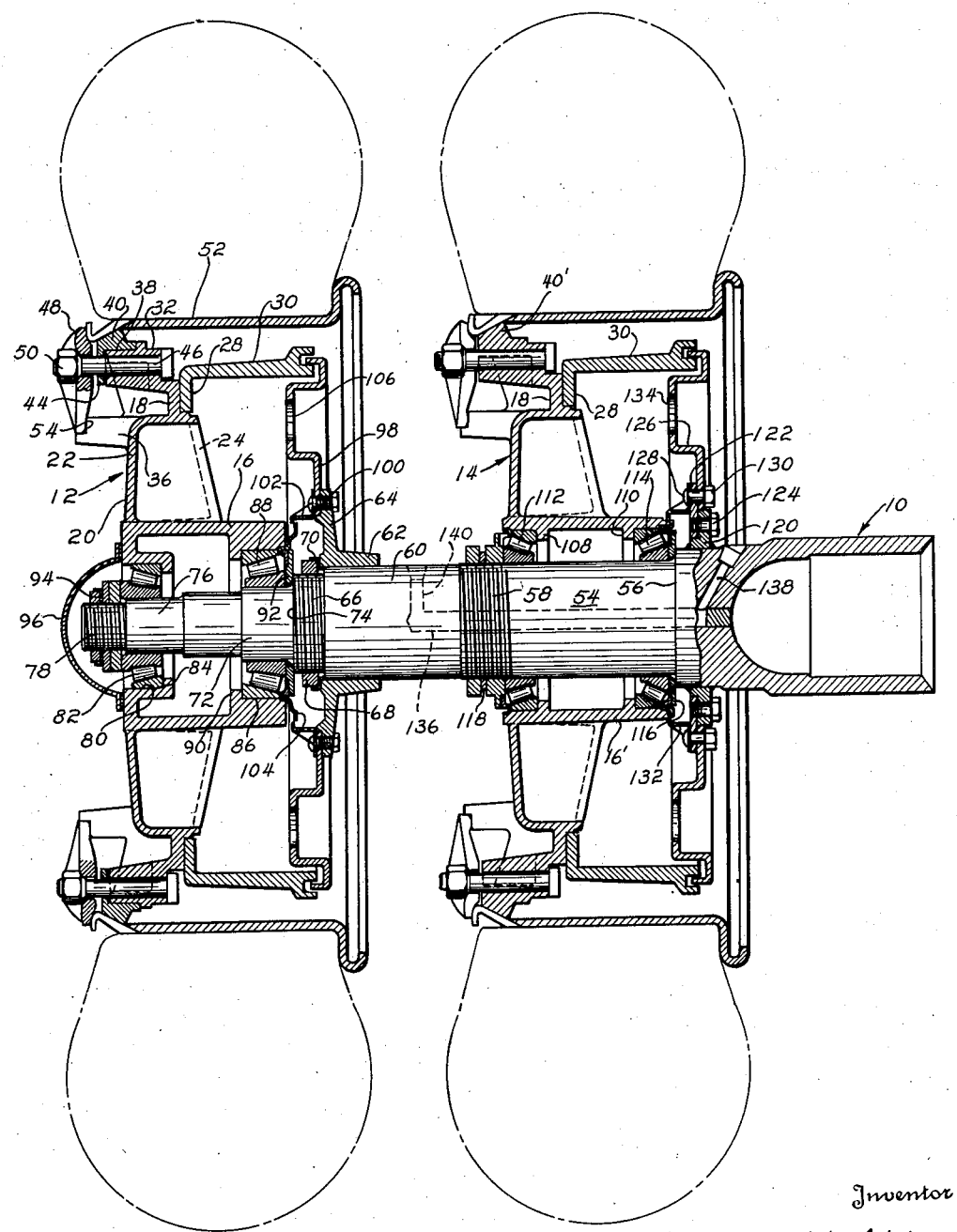
Figure 1 is a diametrical section illustrating a preferred embodiment of my improved dual wheel and axle assembly.

Referring in further detail to the drawings, and more particularly to Figure 1 thereof, the axle indicated generally at 10 may be a fixed or non-driven stub axle of a trailer or other vehicle which is supported at each end by a pair of ground engaging wheels, generally indicated at 12 and 14, respectively, arranged in closely spaced apart relation and providing a dual wheel support for the axle. The wheels 12 and 14 are of generally similar structural form except as will appear, and in the following description the same reference characters will be applied to corresponding parts thereof.

With particular reference to Figures 2-4 wherein outer wheel 12 is illustrated by way of example, each wheel includes a cylindrical hub portion 16. This hub portion of the wheel structure is integrally connected with a concentrically spaced brake drum bolting flange 18 by means of a plurality of hollow radially disposed ribs or spokes 20, the open sides of which face toward the inner end of the hub 16. The outer front wall 22 of each rib 20 is slightly inclined inwardly from the hub 16 with respect to a plane normal to the hub axis. The inner edges of the opposite side walls of the ribs 20 are integrally connected by the webs 24, which are inclined outwardly from the hub 16 in convergent relation to the front walls 22 of the ribs. It will be noted that the webs 24 are located at the inner side of the flange 18, so that the spaces between spokes 20 open outwardly of the wheel. This flange is provided with circumferentially spaced bolt receiving openings 26 to receive suitable fastening bolts (not shown) rigidly securing the end flange 28 of a brake drum 30 to the inner face of the wheel flange 18.

As seen in Figures 2 and 4 the side walls of adjacent ribs 20 are also integrally connected at the base of flange 18 by the laterally projecting flanges 25.

In radial alignment with each rib 20 flange 18 is formed with a laterally disposed outwardly extending boss 32 which is also integrally connected with the outer end of the rib 20 by the side flanges 34. The outer end of each rib 20 has a central laterally projecting lug 36 integrally formed therewith.

Each boss 32 of outer wheel 12 is formed at its outer side with an arcuate seating surface 38 for a tire rim clamping ring 40. The boss 32 also has a bolt receiving opening 42 with the front end of which an opening in flange 44 on the ring 40 registers to receive a bolt 46. A lug 48 when adjusted on the outer end of bolt 46 by a nut 50 cooperates with the ring 40 to securely clamp and hold a tire rim 52 in fixed relation to the wheel structure. The inner end of the clamping lug 48 has rocking engagement on the seat 54 formed in the end of lug 36 on the wheel structure.

However, if desired, instead of providing a separate clamping ring 40, this ring may form a part of the wheel structure, extending between and integrally connecting the lugs 32, as shown at 40' in the illustration of the wheel 14.

The axle 10 is formed with an inner section 54 of reduced diameter providing an annular locating shoulder 56 for the inner wheel 14. This axle section 54 at its outer end is threaded as at 58 for a purpose to be presently explained, and beyond this threaded portion the axle is formed with the slightly outwardly decreasingly tapered section 60, upon which the sleeve 62 of an adapter flange 64 is engaged. At the outer end of axle section 60, a diametrically reduced threaded section 66 is provided to receive an adjustable ring 68 between which and the outer end of the sleeve 62 a suitable sealing member 70 is interposed. By the adjustment of the ring 68, it is evident that the sleeve 62 may be forced inwardly on the tapered axle section 60 and frictionally locked in rigid connection therewith.

At the outer end of section 66, the axle is formed with a further reduced section 72, providing at the inner end thereof the locating shoulder 74 for the outer wheel 12. In spaced relation from the section 72, the axle is formed with a further reduced section 76 and terminates in the threaded end portion 78.

The hub 16 of the outer wheel 12 is provided at its outer end with an internally projecting hollow cylindrical boss 80 to receive a bearing assembly 82, the outer race of which abuts an inwardly projecting flange 84 on the boss 80. At its inner end, hub 16 is formed with a cylindrical recess 86 to receive a bearing assembly 88, the outer race of which abuts a flange 90 at the inner end of the recess. The inner race of bearing assembly 88 has a press fit upon the axle section 72, while the inner race of bearing 82 has a press fit on axle section 76. Preferably, a lubricant seal support plate 92 is interposed between the inner race of bearing 88 and the shoulder 74 of the axle.

A suitable lock nut and fastener assembly 94 is mounted on the threaded end 78 of the axle and by adjustment thereof the wheel 12 with its two bearing assemblies may be axially adjusted as a unit to take up axial play in the bearings and to maintain contact of plate 92 against shoulder 74 on the axle. Preferably, the end of the wheel axle and adjustable assembly 94 are enclosed within a protecting cover member 96 detachably mounted on the outer end of wheel hub 16.

To the adapter flange 64 a backing or brake mechanism support plate 98 is securely fixed by suitable bolts or rivets indicated at 100, which also secure an annular oil retainer cup 102 to said flange. A slinger ring 104 suitably attached to the inner end of the wheel hub 16 directs excess oil passing the bearing 88 into said retainer and prevents the same from collecting upon the parts of the brake mechanism and drum 30.

The usual brake shoes are mounted on the plate 98 with the operating mechanism therefor and said plate is provided with an opening 106, in which is adapted to be mounted the usual hydraulic actuating cylinder for the brake mechanism (not shown).

The hub 16' of inner wheel 14 is provided, in spaced relation to each of its ends, with internal flanges 108 and 110, said flanges forming abutment stops for the outer races of the bearing assemblies 112 and 114, respectively. A lubricant seal support plate 116 is interposed between inner bearing assembly 114 and shoulder 56 on the axle. Upon the threaded portion 58 of the axle, a lock nut and fastener assembly 118 is adjustably mounted to coact with bearing assembly 112 and axially adjust the wheel 14 with its bearing assemblies on the axle section 54 and maintain abutting contact of plate 116 against locating shoulder 56 on the axle. It will thus be seen that independent bearing adjustment is provided for each wheel and by proper adjustment of the assemblies 94 and 118 on the axle, the two wheels may be at all times maintained in their correct axially spaced apart position.

In inwardly spaced relation from the shoulder 56 an adapter flange 120 is welded or otherwise rigidly fixed to the axle 10. The backing or supporting plate for the brake mechanism of wheel 14 comprises an inner relatively narrow annular section 122, which is detachably secured to the outer side of flange 120 by bolts indicated at 124. The major relatively wide annular section 126 of the backing plate is provided at its inner edge with circumferentially spaced apertures to receive stud bolts 128 upon which nuts 130 are threaded to detachably secure the plate section 126 in rigidly fixed relation to the inner side of inner plate section 122. The stud bolts 128 also secure the lubricant retainer ring 132 to the outer face of plate section 122, to receive and reject from the brake mechanism space any lubricant passing through bearing 114, in the manner above explained in connection with wheel 12.

The backing plate section 126 is substantially of the same cross-sectional form as plate 98 previously described and is provided with a mounting opening 134 for the usual actuating cylinder for the brake operating mechanism mounted thereon.

From the foregoing description, it will be evident that when it is necessary to service the brake mechanism of the inner wheel 14, this may be readily done by removing the nuts 130 and detaching the backing plate section 126 from section 122 thereof and moving said section 126 away from wheel 14 inwardly along the axle to a convenient position where access may be had to all parts of the brake mechanism. Thus it is not necessary to dismount either wheel from the axle, and access may also be freely had to the interior of wheel 14 and its drum 30 for inspection and such repairs as may be necessary.

For the purpose of transmitting the hydraulic medium to the brake actuating cylinder mounted upon the backing plate 98 associated with the outer wheel 12, I provide the axle with a longitudinally extending coaxial passage 136, the inner end of which opens upon the periphery of the axle in inwardly spaced relation from the adapter flange 120 through the obliquely inclined duct 138. The outer end of passage 136 also opens upon the periphery of axle section 60 through the radially disposed duct 140. Suitable flexible tubing connects duct 138 with the master cylinder or other supply source. A similar tubing connects the outlet duct 140 with the cylinder of the hydraulic brake actuator for wheel 12.

In the event that the axle beam is solid, instead of drilling internal passages 136, 138 and 140, it will probably be more expedient to mill an external channel along the surface of the axle deep enough to accommodate a suitable length of fluid conducting conduit extending from the inner side of the inner wheel to the space between the wheels.

From the above description, the several practical advantages of the present invention will be readily appreciated. Since the adjusting assembly 118 for the inner wheel, as well as the adjusting assembly 94 for the outer wheel, is easily accessible, said wheels may be independently adjusted at any time and maintained in correctly located, axially spaced apart relation upon the axle shaft. It will also be seen that I have provided very simple means for mounting the brake mechanism of the inner wheel on the axle so that it may be quickly serviced, without requiring the dismounting of either wheel. Also, after both wheels are dismounted from the axle, the entire backing plate with the brake mechanism for the inner wheel thereon may then be moved outwardly over the end of the axle, by merely removing the bolts or screws 124 connecting said backing plate with the adapter flange 120.

The novel wheel structure herein described is also an important feature of the invention, as it provides a wheel which may be easily and inexpensively fabricated, having maximum radial rigidity, and, by reason of the truss effect of the ribs 20 and webs 24 between the wheel hub and the brake drum carrying flange 18, offering effective resistance to high circumferential braking torque forces which would tend to distort the wheel structure. By the provision of independent braking mechanisms for the wheels, when the brakes are applied and there is greater tractive engagement of one wheel than the other with the road surface, the wheels may have independent rotation about the axle.

Finally, it will be noted that the several cooperating elements of the present invention are of very simple structural form, conducing to low initial production cost and minimum maintenance expense, with maximum efficiency in functional operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a dual wheel assembly, an axle having at its outer end axially spaced wheel locating means, outer and inner dual wheels journalled on said axle for independent rotation, independently adjustable devices directly mounted on the axle at the outer sides of said wheels and cooperating with the respective wheels to urge said wheels inwardly on the axle against the respective locating means to maintain said wheels in accurately spaced parallel planes of rotation relative to the axle, a brake mechanism supporting adaptor member mounted on said axle at the inner side of the outer wheel independently of the adjusting device for the inner wheel, and additional means axially adjustable on the axle coacting with said member to removably secure the same in fixed relation to the axle.

2. In a dual wheel assembly, an axle, outer and inner dual wheels directly journalled on said axle in closely spaced relation for independent rotation, a supporting member for brake mechanism for the inner wheel, and means for detachably mounting said member on said axle whereby said member and the brake mechanism may be displaced inwardly of the axle in spaced relation from the inner wheel without dismounting either of said wheels from the axle, said mounting means including means also permitting outward removal of said member and brake mechanism as a unit from the axle when the wheels are dismounted therefrom.

3. The dual wheel assembly defined in claim 2, wherein an adapter flange is fixed to the axle and said brake mechanism supporting member includes an inner section detachably mounted on the outer side of said flange and an outer section detachably mounted on the inner side of said inner section.

4. In a dual wheel assembly, an axle having in succession an outwardly facing first stop shoulder, a reduced inner wheel bearing support portion, a first threaded portion, a brake adapter attachment portion, a second outwardly facing stop shoulder, a reduced outer wheel bearing support portion and an outer threaded portion, a retainer on said first threaded portion, an inner wheel and bearing assembly clamped between said retainer and said first stop shoulder, a brake adapter sleeve removably mounted on said attachment portion independently of said inner wheel and bearing assembly and retainer means on said axle for locking the adapter in fixed relation to said axle, an outer retainer on said outer threaded portion, and an outer wheel and bearing assembly clamped between said outer retainer and said second stop shoulder.

5. In a vehicle wheel assembly, an axle, a road wheel journalled thereon, a brake mechanism supporting plate associated with said wheel at the inner side thereof, and means for detachably mounting said plate on the axle in fixed relation to the wheel, including a part detachably connected with said plate and axle and permitting inward displacement of the plate and brake mechanism relative to said part along the axle in the mounted position of the wheel, or outward unitary removal of said plate and mechanism with said part over the axle end after the wheel has been dismounted.

6. A vehicle wheel comprising a hub portion, a brake drum attachment flange concentrically spaced from said hub portion, and structure integrally connecting said hub and flange embodying a plurality of radial inwardly opening hollow spokes having outer end walls extending axially of the hub from opposite sides of said flange.

7. The vehicle wheel defined in claim 6, in which the front walls of said spokes are radially inclined inwardly from the hub toward said flange, and wherein said structure includes connecting webs between the inner edges of the side walls of the spokes radially inclined outwardly from the hub toward said flange.

8. A vehicle wheel comprising a one piece member having a hub portion and a brake drum supporting flange integrally connected by intermediate wheel structure rigidly maintaining said flange in concentric relation to the hub and in a plane substantially normal to the axis thereof, said intermediate structure embodying a plurality of hollow radial spokes having parts thereof extending axially in opposite directions from the plane of said flange.

9. The vehicle wheel as defined in claim 8 wherein said parts on one side of said flange close the outer ends of said spokes and are integrally connected between adjacent spokes by laterally projecting flanges concentric with the hub.

10. The vehicle wheel as defined in claim 8, together with tire rim attaching bosses in radial alignment with said spokes integrally formed with the outer periphery of said flange and projecting laterally from one side thereof.

11. The vehicle wheel as defined in claim 8, wherein said structure further includes web sections integrally connecting the side walls of adjacent spokes and forming reinforcing struts radially inclined outwardly from the hub wall to said flange.

12. The vehicle wheel as defined in claim 11, together with a front connecting wall between the side walls of each spoke convergently inclined inwardly towards said web sections between said hub and flange.

HERBERT W. ALDEN.

REFERENCES CITED

The following references are of record in the file of this patent:

UNITED STATES PATENTS

| Number | Name | Date |
| --- | --- | --- |
| 1,265,741 | Burrows | May 14, 1918 |
| 1,881,097 | Sargent | Oct. 4, 1932 |
| 1,896,821 | Keller | Feb. 7, 1933 |
| 2,082,292 | Kendall | June 1, 1937 |
| 2,263,188 | Pascoe | Nov. 18, 1941 |
| 2,289,166 | Ash | July 7, 1942 |